US012322866B2

(12) United States Patent
Hara et al.

(10) Patent No.: US 12,322,866 B2
(45) Date of Patent: Jun. 3, 2025

(54) ANTENNA MODULE

(71) Applicant: TDK CORPORATION, Tokyo (JP)

(72) Inventors: Yasuyuki Hara, Tokyo (JP); Tomoyuki Goi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 18 days.

(21) Appl. No.: 17/693,721

(22) Filed: Mar. 14, 2022

(65) Prior Publication Data

US 2022/0320752 A1 Oct. 6, 2022

(30) Foreign Application Priority Data

Mar. 30, 2021 (JP) ................................ 2021-057567

(51) Int. Cl.
*H01Q 21/06* (2006.01)
*H01Q 1/38* (2006.01)
*H01Q 9/04* (2006.01)

(52) U.S. Cl.
CPC ............. *H01Q 21/065* (2013.01); *H01Q 1/38* (2013.01); *H01Q 9/0407* (2013.01)

(58) Field of Classification Search
CPC ...... H01Q 21/065; H01Q 1/38; H01Q 9/0407; H01Q 1/2283; H01Q 1/523; H01Q 21/061; H01Q 1/002; H01Q 1/48; H01Q 1/526; H05K 9/00; H05K 9/0022; H05K 9/0024; H05K 1/0224; H05K 9/0028
USPC ................................ 343/702; 361/818, 800
See application file for complete search history.

(56) References Cited

U.S. PATENT DOCUMENTS 10,978,780 B2 * 4/2021 Ryoo ................... H01Q 21/293
2008/0088510 A1 * 4/2008 Murata .................... H01Q 3/24 343/876
2010/0327068 A1 * 12/2010 Chen .................... H01Q 1/2283 235/492
2012/0127045 A1 * 5/2012 Kashino ................. H01Q 1/243 343/702
2012/0280380 A1 * 11/2012 Kamgaing ......... H01Q 21/0093 343/893
2016/0049723 A1 * 2/2016 Baks .................... H01Q 9/0457 343/848
2017/0229784 A1 * 8/2017 Kitamura ............. H01Q 9/0414
2018/0159203 A1 * 6/2018 Baks ...................... H01Q 9/045
2019/0191597 A1 * 6/2019 Han ..................... H05K 9/0024
2019/0229421 A1 * 7/2019 Onaka ...................... H01Q 9/06
2019/0279950 A1 * 9/2019 Kim .................... H01L 23/3114
2019/0305432 A1 * 10/2019 Kim ......................... H01Q 1/38
2019/0379134 A1 * 12/2019 Paulotto ............... H01Q 21/062
2020/0243971 A1 * 7/2020 Huang ................... H01Q 5/385
2020/0295463 A1 * 9/2020 Yamada ............. H01Q 21/0025
(Continued)

FOREIGN PATENT DOCUMENTS

JP 4-121110 U 10/1992
JP H05291824 A 11/1993
(Continued)

*Primary Examiner* — David E Lotter
(74) *Attorney, Agent, or Firm* — YOUNG LAW FIRM, P.C.

(57) ABSTRACT

Disclosed herein is an antenna module that includes an antenna component including a plurality of antenna elements and a ground conductor surrounding each of the plurality of antenna elements; and a metal member disposed adjacent to the ground conductors surrounding outermost ones of the plurality of antenna elements.

16 Claims, 8 Drawing Sheets

(56) References Cited

U.S. PATENT DOCUMENTS

| | | | | |
|---|---|---|---|---|
| 2020/0350699 | A1* | 11/2020 | Omuro | H01Q 21/065 |
| 2021/0005955 | A1* | 1/2021 | Sudo | H01Q 1/523 |
| 2021/0029821 | A1* | 1/2021 | Hwang | H01Q 15/008 |
| 2021/0398923 | A1* | 12/2021 | Kang | H01L 23/552 |
| 2022/0085502 | A1 | 3/2022 | Ara | |

FOREIGN PATENT DOCUMENTS

| | | | |
|---|---|---|---|
| JP | 2005252648 | A | 9/2005 |
| JP | 2006121406 | A | 5/2006 |
| JP | 2018093491 | A | 6/2018 |
| WO | 2019146183 | A1 | 11/2020 |

* cited by examiner

ANTENNA MODULE

CROSS-REFERENCE TO RELATED APPLICATION

This application claims the benefit of Japanese Patent Application No. 2021-057567, filed on Mar. 30, 2021, the entire disclosure of which is incorporated by reference herein.

BACKGROUND

Field

The present disclosure relates to an antenna module.

Description of Related Art

International Publication WO 2019/146183 discloses an antenna component having a dummy antenna element which is disposed adjacent to an outermost antenna element of a plurality of antenna elements and thereby achieving improved radiation characteristics.

However, adding the dummy antenna element to improve radiation characteristics disadvantageously increases the number of components and production cost.

SUMMARY

It is therefore an object of the present disclosure to improve radiation characteristics of an antenna component without adding a dummy antenna element.

An antenna module according to one embodiment of the present disclosure includes: an antenna component including a plurality of antenna elements and a ground conductor surrounding each of the plurality of antenna elements; and a metal member disposed adjacent to the ground conductors surrounding the outermost ones of the plurality of antenna elements.

BRIEF DESCRIPTION OF THE DRAWINGS

The above features and advantages of the present disclosure will be more apparent from the following description of certain preferred embodiments taken in conjunction with the accompanying drawings, in which:

FIG. 1A is a schematic perspective view, and FIG. 1B is a schematic plan view;

DETAILED DESCRIPTION OF THE EMBODIMENTS

Preferred embodiments of the present disclosure will be explained below in detail with reference to the accompanying drawings.

Figure 1A:
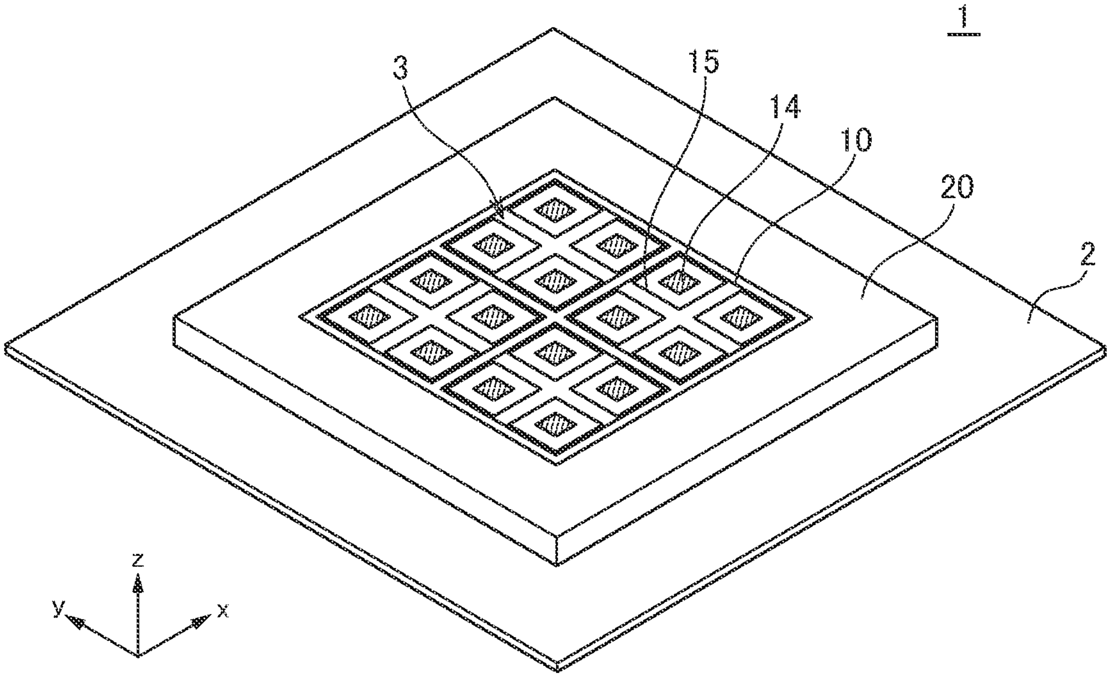
FIGS. 1A and 1B are views for explaining the structure of an antenna module 1 according one embodiment, where
Figure 1B:
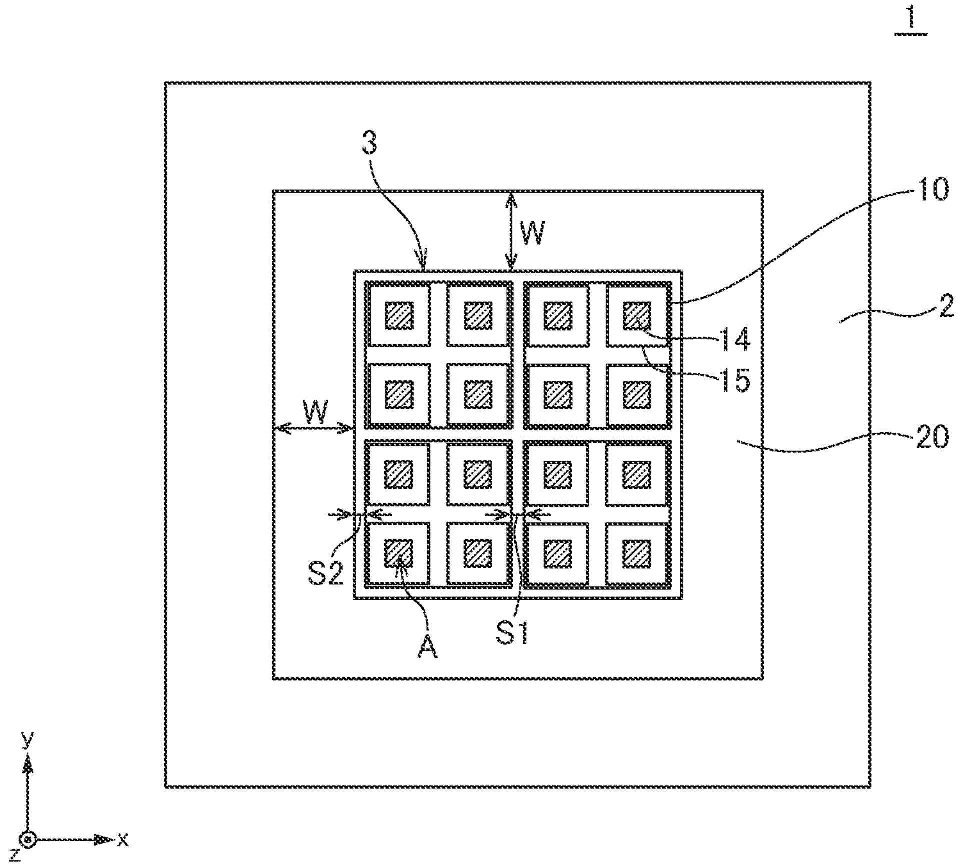

FIGS. 1A and 1B are views for explaining the structure of an antenna module 1 according one embodiment. FIG. 1A is a schematic perspective view, and FIG. 1B is a schematic plan view.

As illustrated in FIG. 1, an antenna module 1 according to one embodiment includes an antenna component having a plurality of antenna units 10 mounted on a circuit board 2 and a metal member 20 surrounding the plurality of antenna units 10. Although four antenna units 10 are disposed in an array in the xy-direction in the example illustrated in FIG. 1, the number and arrangement of the antenna units 10 to be used are not limited to those illustrated in FIG. 1. The antenna units 10 disposed adjacent in the x- or y-direction are spaced from each other by a gap S1. The antenna component 3 and metal member 20 are spaced from each other by a gap S2 in both the x- and y-directions.

Figure 2:
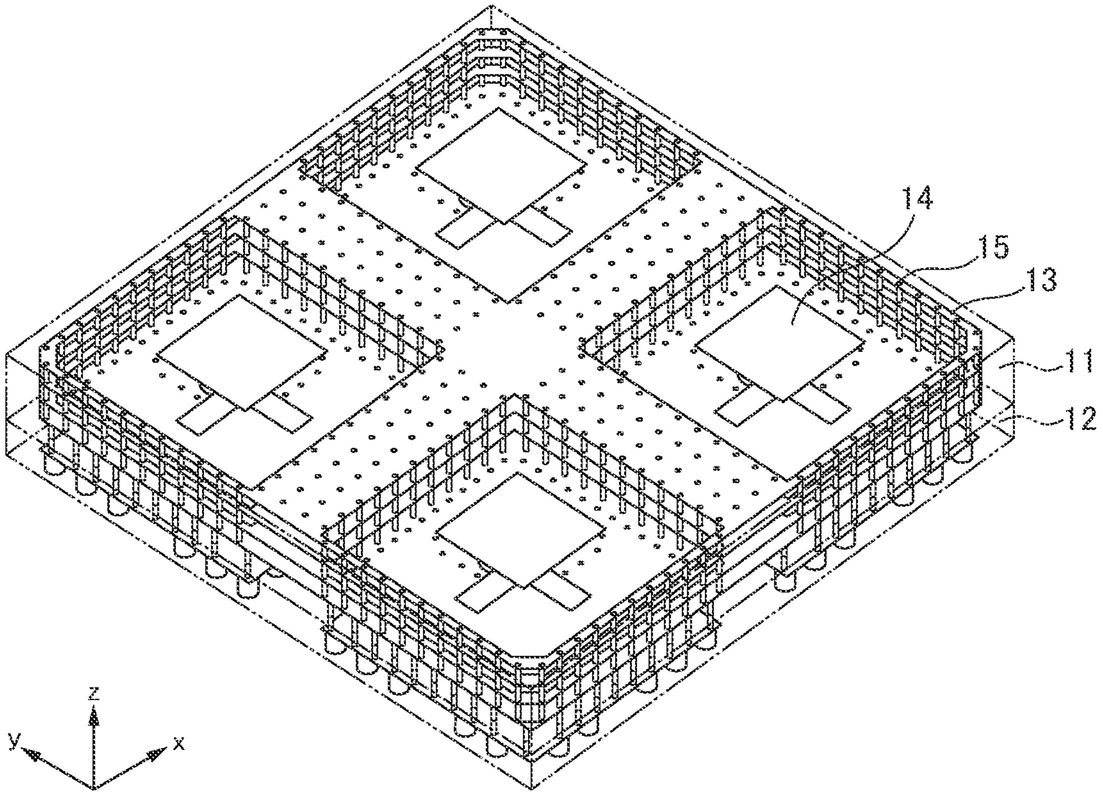
FIG. 2 is a schematic perspective view illustrating an antenna unit 10.

FIG. 2 is a schematic perspective view illustrating the antenna unit 10.

As illustrated in FIG. 2, the antenna unit 10 includes dielectric layers 11, 12, four antenna elements 14 formed on the dielectric layer 11, a plurality of ground pillars 15 surrounding each antenna element 14, and a ring pattern 13 connecting the plurality of ground pillars 15. Thus, in total, 16 antenna elements 14 are included in the antenna component 3. Although four antenna elements 14 are arranged in an array in the x- and y-directions in the example illustrated in FIG. 1, the number and arrangement of the antenna elements 14 included in one antenna unit 10 are not limited to those illustrated in the example of FIG. 1. The antenna component 3 including 16 antenna elements 14 are thus divided into the four antenna units 10, so that connection failures and the like due to a difference in thermal expansion coefficient between the antenna unit 10 and the circuit board 2 can be prevented. In addition, the four antenna elements 14 are integrated in one antenna unit 10, so that the number of components is not increased. The plurality of ground pillars 15 and ring pattern 13 are each an example of a ground conductor.

Figure 3:
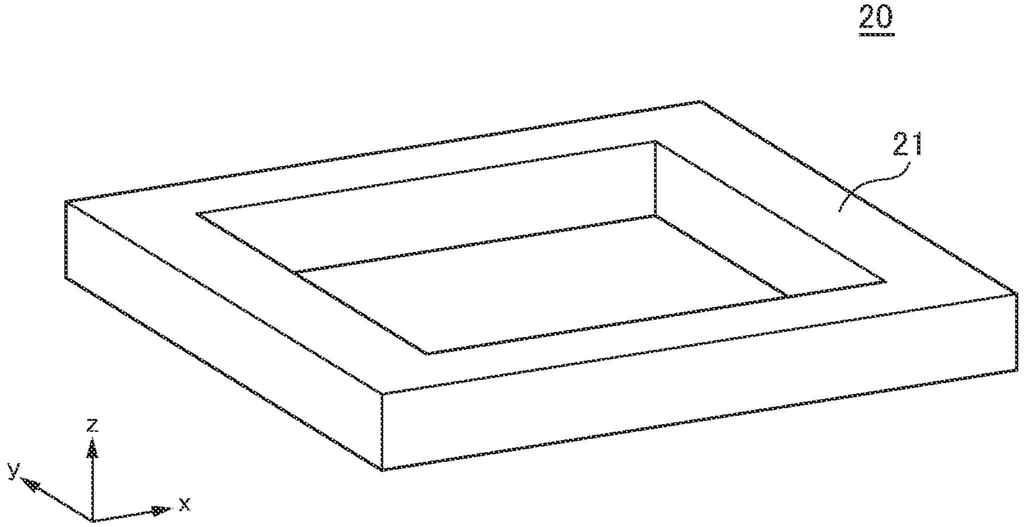
FIG. 3 is a schematic perspective view illustrating a metal member 20.

FIG. 3 is a schematic perspective view illustrating the metal member 20.

Figure 4:
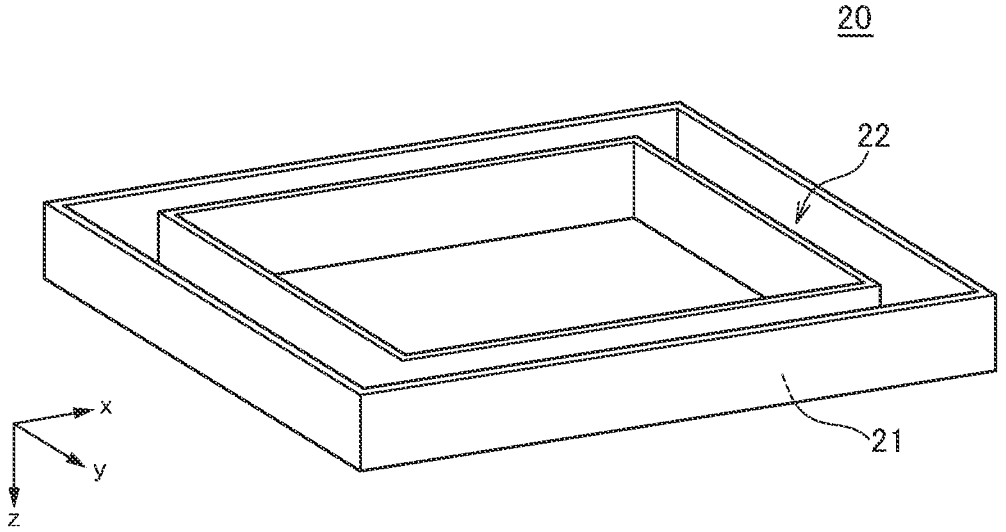
FIG. 4 is a schematic perspective view illustrating the metal member 20 according to a modification.
Figure 5:
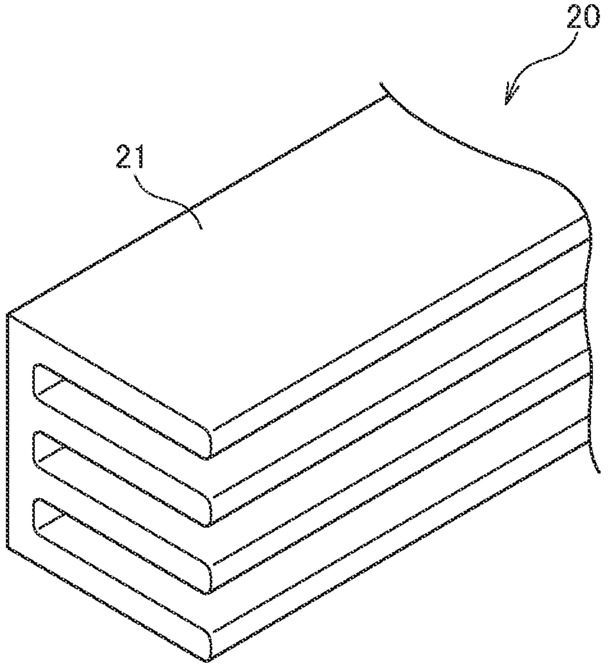
FIG. 5 is a schematic perspective partial view illustrating the metal member 20 according to another modification.

As illustrated in FIG. 3, the metal member 20 has a frame-like shape and is made of a metal material such as copper. Although the metal member 20 may be made entirely of a metal material, or may have a hollow inside, at least the xy plane (upper surface 21) facing the same direction as the antenna element 14 needs to be made of a metal material. The metal member 20 may have a structure illustrated in FIG. 4. That is, a hollow 22 may be provided inside, and a part constituting the xy plane (lower surface) facing the circuit board 2 may be removed. Further, the xz plane and yz plane each need not be a flat surface and may have a fin-like shape as illustrated in FIG. 5. This enhances heat dissipation characteristics.

Figure 6:
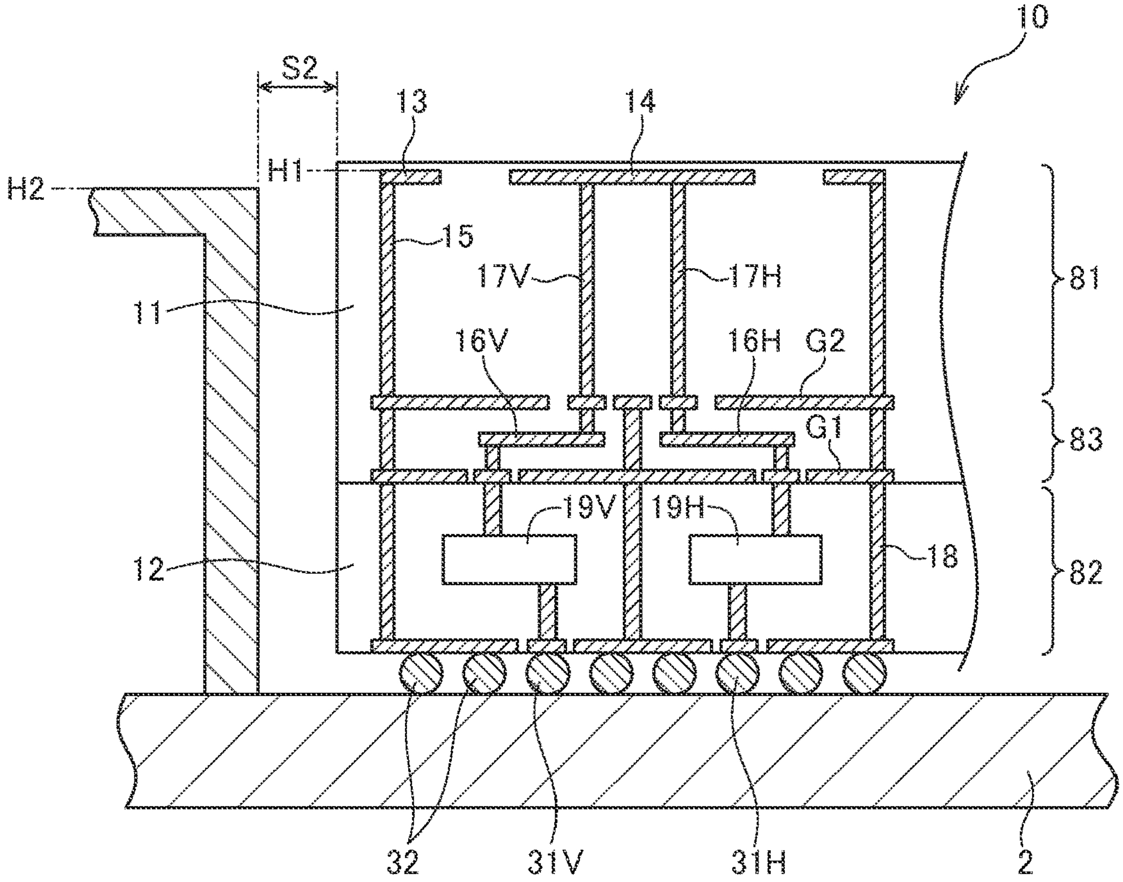
FIG. 6 is a schematic diagram for explaining an internal structure of the antenna unit 10.

FIG. 6 is a view for explaining the internal structure of the antenna unit 10, which schematically illustrates a state where the antenna unit 10 is mounted on the circuit board 2.

As illustrated in FIG. 6, the antenna unit 10 has a stack structure including an antenna layer 81, a filter layer 82, and a wiring layer 83 positioned between the antenna layer 81 and the filter layer 82.

The antenna layer 81 has the dielectric layer 11 and the plurality of antenna elements 14 embedded in the dielectric layer 11. The antenna layer 81 further has the plurality of ground pillars 15 and the ring pattern 13 surrounding the antenna elements 14 in a plan view as viewed in the stacking direction (z-direction). The ground pillars 15 are each a pillar-shaped conductor extending in the z-direction so as to penetrate the dielectric layer 11. The filter layer 82 includes the dielectric layer 12 and a conductor pattern or a chip component embedded in the dielectric layer 12. A dielectric material constituting the dielectric layer 12 has a dielectric constant higher than a dielectric material constituting the dielectric layer 11. The material constituting the dielectric layers 11 and 12 may be LTCC. The filter layer 82 serves as a mounting surface with respect to the circuit board 2. Signal terminals 31V and 31H and a plurality of ground terminals 32 are provided on the mounting surface. The signal terminal 31V is a terminal for inputting/outputting vertically polarized antenna signals, and the signal terminal 31H is a terminal for inputting/outputting horizontally polarized antenna signals.

A ground pattern G1 is provided between the filter layer 82 and the wiring layer 83, and a ground pattern G2 is provided between the wiring layer 83 and the antenna layer 81. The ground pattern G2 is embedded in the dielectric layer 11. The ground pattern G1 is provided at the interface between the dielectric layers 11 and 12. The ground patterns G1 and G2 are connected to the ground pillars 15 penetrating the dielectric layer 11.

The filter layer 82 has filter circuits 19V and 19H. The filter circuits 19V and 19H are band-pass filters and connected respectively to the signal terminals 31V and 31H. The filter circuits 19V and 19H are surrounded by the plurality of ground pillars 18 in a plan view as viewed in the stacking direction. The ground pillars 18 are each a pillar-shaped conductor extending in the z-direction so as to penetrate the dielectric layer 12 and are connected to the ground pattern G1.

The wiring layer 83 has feeding patterns 16V and 16H. One ends of the feeding patterns 16V and 16H are connected respectively to the filter circuits 19V and 19H, and the other ends thereof are connected to different planar positions of the antenna element 14 respectively through the feeding pillars 17V and 17H. The feeding patterns 16V and 16H are surrounded by the plurality of ground pillars 15 in a plan view as viewed in the stacking direction.

With the above configuration, the antenna element 14 functions as a patch conductor of a dielectric antenna. Since each antenna element 14 is surrounded by the plurality of ground pillars 15, mutual interference between the antenna elements 14 is suppressed.

Figure 7:
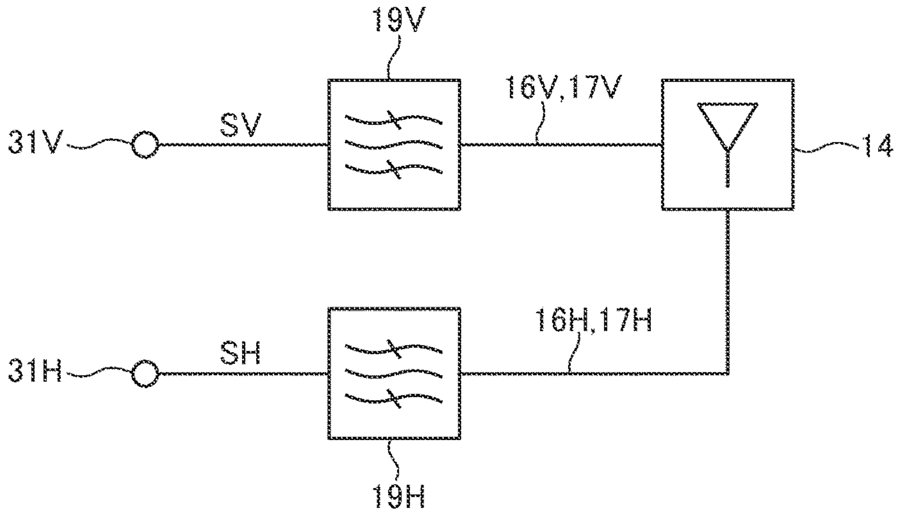
FIG. 7 is a circuit diagram of the antenna unit 10, which illustrates a part relating to one antenna element 14.

FIG. 7 is a circuit diagram of the antenna unit 10, which illustrates a part relating to one antenna element 14.

As illustrated in FIG. 7, antenna signals SV and SH fed respectively to the signal terminals 31V and 31H are fed to the antenna element 14 through the filter circuits 19V and 19H, respectively. The antenna signals SV and SH are fed to the antenna element 14 at positions mutually different by 90°. The antenna signals SV and SH are thus radiated from the antenna element 14 into space.

The height positions of the upper surface of the antenna unit 10 and an upper surface 21 of the metal member 20 almost coincide with each other. The upper surface of the antenna unit 10, which is defined by the position of the leading end of the ground pillar 15 in the z-direction, is a second surface of the ground pillar 15 that is positioned on the side opposite to the mounting surface with respect to the circuit board 2 on which the antenna component 3 is mounted and is located at a height position H1. The upper surface 21 of the metal member 20 is a first surface positioned on the side opposite to the mounting surface with respect to the circuit board 2 on which the metal member 20 is mounted. When the ring pattern 13 connecting the leading ends of the plurality of ground pillars 15 is present, the surface of the ring pattern 13 constitutes the upper surface of the antenna unit 10. The upper surface of the antenna element 14 may be located at the height position H1 or at a position slightly lower than the height position H1 as illustrated in FIG. 6.

In the present embodiment, the metal member 20 is provided so as to surround the antenna component 3 including the plurality of antenna units 10, and the height position H2 of the upper surface 21 of the metal member 20 almost coincides with the height position H1 of the antenna unit 10, thereby improving radiation characteristics of the outermost antenna elements 14. That is, when the thus configured metal member 20 is absent, the outermost antenna elements 14 each have a part not adjacent to the other antenna element 14 while the antenna elements 14 positioned around the center portion are each completely surrounded by the other antenna elements 14, so that radiation characteristics differ between the outermost antenna elements 14 and the antenna elements 14 around the center portion. However, in the present embodiment, the antenna component 3 including the plurality of antenna units 10 is surrounded by the metal member 20, so that the metal member 20 functions in the same manner as a dummy antenna element, with the result that a difference in characteristics between the plurality of antenna elements 14 is reduced.

Although the height positions H1 and H2 need not completely coincide with each other, the difference therebetween is preferably $\lambda/20$ or less, where $\lambda$ is the wavelength of an electromagnetic wave radiated from the antenna element 14. This is because when the difference between the height positions H1 and H2 exceeds $\lambda/20$, a difference in conditions between the outermost antenna elements 14 and the antenna elements 14 around the center portion becomes large to cause a significant difference in radiation characteristics therebetween. Further, although the magnitude relation between the height positions H1 and H2 is not particularly limited, it is preferable that the height position H1 is equal to or higher than the height position H2. In other words, the height position H2 of the upper surface 21 of the metal member 20 is preferably lower than the height position H1. That is, when $H1<H2$ is satisfied, a radiation pattern from the xz plane (E plane) tends to tilt, so that the H1 is desirably made equal to or slightly larger than H2 in consideration of manufacturing tolerances.

A width W (see FIG. 1B) of the upper surface 21 of the metal member 20 is preferably $\lambda/2$ or more. This is because making the width W equal to or more than $\lambda/2$ allows the metal member 20 to function in substantially the same manner as a dummy antenna. The width W of the metal member refers to the width in the x-direction at a portion adjacent to the antenna elements 14 positioned at the end portion in the x-direction and to the width in the y-direction at a portion adjacent to the antenna elements 14 positioned at the end portion in the y-direction.

The gap S2 between the metal member 20 and the antenna units 10 is preferably equal to or wider than the gap S1 between the adjacent antenna units 10 and equal to or narrower than λ/2. This is because when the gap S2 is excessively narrow or excessively wide, radiation characteristics of the outermost antenna elements 14 differ from those of the other antenna elements 14.

Figure 8:
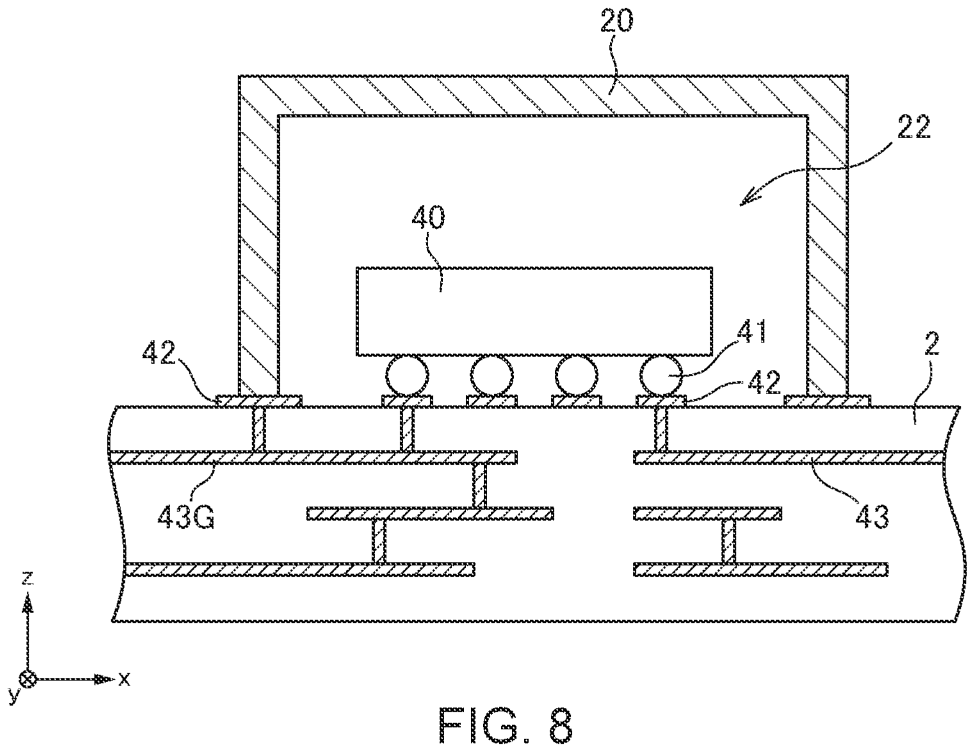
FIG. 8 is a schematic cross-sectional view illustrating an example in which an electronic component 40 is housed in a hollow 22 of the metal member 20.

When the hollow 22 is provided inside the metal member 20, an electronic component 40 such as a semiconductor chip may be accommodated in the hollow 22, as illustrated in the schematic cross-sectional view of FIG. 8. This allows more effective use of the surface of the circuit board 2 and allows the metal member 20 to function as a shield case for shielding the electronic component 40 from electromagnetic waves. A terminal electrode 41 of the electronic component 40 is connected to a conductor pattern 43 provided on the surface or inside the circuit board 2 through a land pattern provided on the surface of the circuit board 2. A conductor pattern 43G for supplying a ground potential may be connected to the metal member 20 through the land pattern 42. This allows the metal member 20 to function as a heat sink to make it possible to enhance heat dissipation characteristics of the circuit board 2. In particular, when the metal member 20 has a fin-like shape as illustrated in FIG. 5, the function as a heat sink can be significantly enhanced. As a matter of course, the metal member 20 need not necessarily be connected to the conductor pattern 43G and may only be fixed to the circuit board 2 using an adhesive. Even in this case, heat dissipation characteristics of the circuit board 2 and antenna component 3 can be enhanced.

As described above, the antenna module 1 according to the present embodiment has the metal member 20 surrounding the plurality of antenna elements 14, thus making it possible to improve radiation characteristics of the outermost antenna elements 14 without adding any dummy antenna element. In particular, in the present embodiment, the filter layer 82 and the like are incorporated in the antenna unit 10, so that the thickness of the antenna unit 10 is large, and thus the height position of the antenna elements 14 with respect to the circuit board 2 is high. In such a case, radiation characteristics of the outermost antenna elements 14 significantly change unless the metal member 20 is added; however, according to the present embodiment, providing the metal member 20 can prevent a change in radiation characteristics. In addition, the metal member 20 is constituted of a single part, thus allowing a reduction in the number of components.

Figure 9:
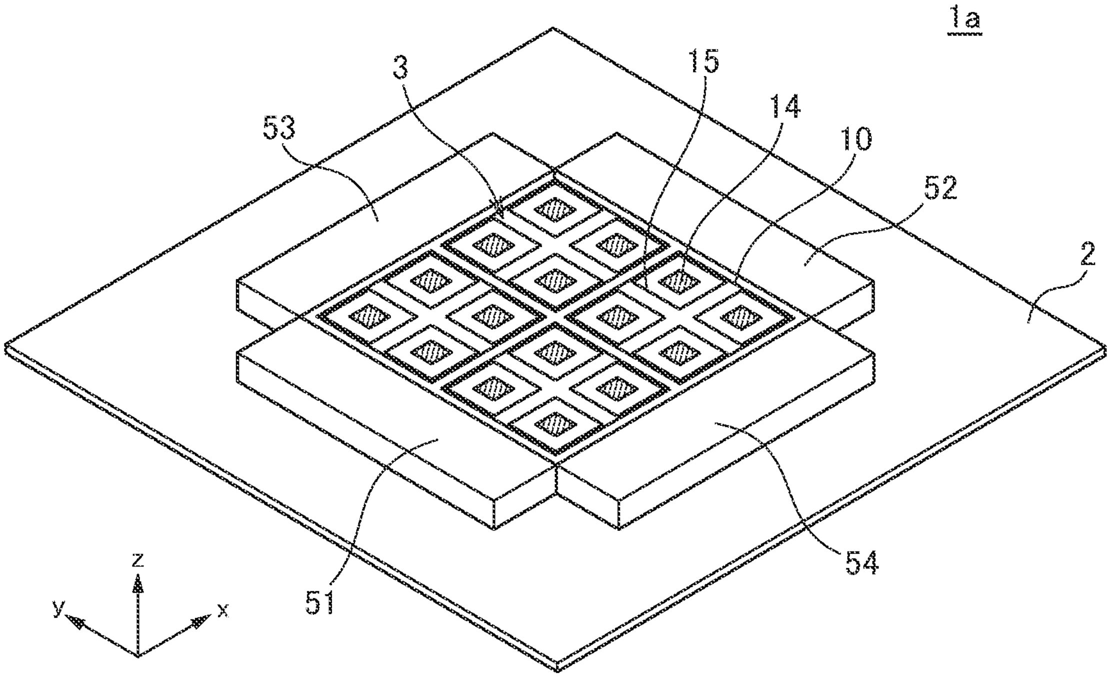
FIG. 9 is a schematic perspective view for explaining the structure of an antenna module 1*a* according to a first modification.

FIG. 9 is a schematic perspective view for explaining the structure of an antenna module 1*a* according to a first modification.

The antenna module 1*a* illustrated in FIG. 9 differs from the antenna module 1 illustrated in FIG. 1 in that four metal members 51 to 54 are used in place of the metal member 20. Other basic configurations are the same as those of the antenna module 1 illustrated in FIG. 1, so the same reference numerals are given to the same elements, and overlapping description will be omitted.

As illustrated in FIG. 9, the metal members 51 and 52 are disposed on both sides in the x-direction of the antenna component 3, and the metal members 53 and 54 are disposed on both sides in the y-direction of the antenna component 3. Even in this configuration, characteristics of the outermost antenna elements 14 can be made to almost match those of the antenna elements 14 positioned around the center portion.

As exemplified by the antenna module 1*a* illustrated in FIG. 9, the metal member need not necessarily be constituted of a single part that surrounds the antenna component 3 but may be constituted of a plurality of parts that are disposed along the sides of the antenna component 3. This enhances the degree of design freedom. Further, the metal member 20 need not necessarily be disposed along all the sides of the antenna component 3, but it is sufficient to dispose the metal member 20 along at least one side of the antenna component 3 according to characteristics required of the antenna module. For example, some of the metal members 51 to 54 may be omitted from the antenna module 1*a* illustrated in FIG. 9. Further, the metal members 51 to 54 may each be constituted of a plurality of parts.

Figure 10:
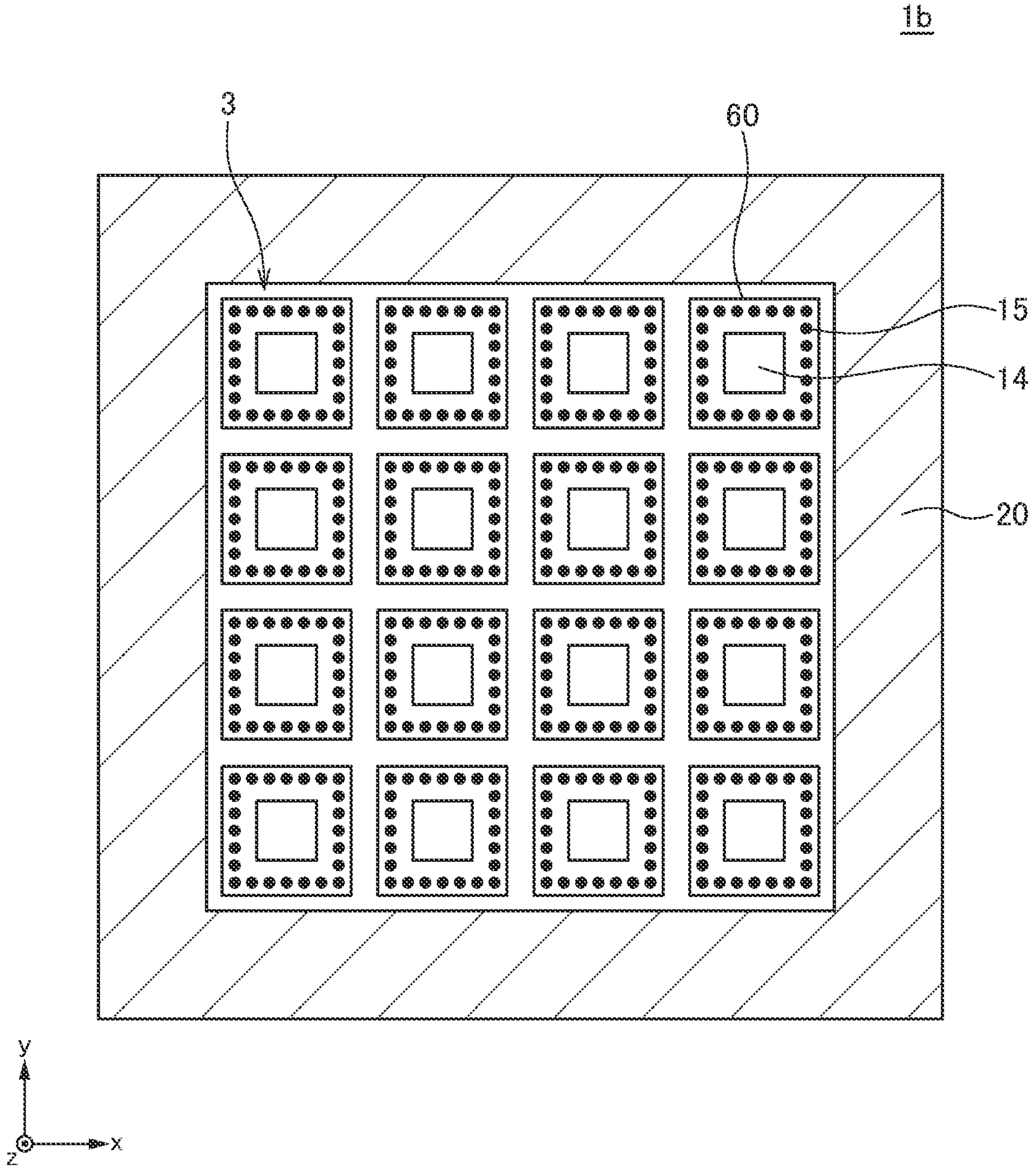
FIG. 10 is a schematic plan view for explaining the structure of an antenna module 1*b* according to a second modification.

FIG. 10 is a schematic plan view for explaining the structure of an antenna module 1*b* according to a second modification.

The antenna module 1*b* illustrated in FIG. 10 differs from the antenna module 1 illustrated in FIG. 1 in that 16 antenna units 60 arranged in an array in the x- and y-directions constitute the antenna component. Other basic configurations are the same as those of the antenna module 1 illustrated in FIG. 1, so the same reference numerals are given to the same elements, and overlapping description will be omitted.

As illustrated in FIG. 10, the antenna unit 60 includes one antenna element 14 and the plurality of ground pillars 15 surrounding the antenna element 14. That is, unlike the antenna unit 10 illustrated in FIG. 2 and the like, one antenna unit 14 is assigned to one antenna unit 60. As exemplified by the antenna module 1*b* illustrated in FIG. 10, one antenna unit need not necessarily include a plurality of antenna elements.

Further, the number of antenna elements 14 arranged in the x-direction and the number of antenna elements 14 arranged in the y-direction need not necessarily be the same, and the antenna elements 14 may be arranged in a 2×8 array.

While the preferred embodiment of the present disclosure has been described, the present disclosure is not limited to the above embodiment, and various modifications may be made within the scope of the present disclosure, and all such modifications are included in the present disclosure.

The technology according to the present disclosure includes the following configuration examples, but not limited thereto.

An antenna module according to one embodiment of the present disclosure includes: an antenna component including a plurality of antenna elements and a ground conductor surrounding each of the plurality of antenna elements; and a metal member disposed adjacent to the ground conductors surrounding the outermost ones of the plurality of antenna elements.

According to the present disclosure, it is possible to improve radiation characteristics of an antenna component without adding a dummy antenna element.

The antenna component may have a configuration in which the plurality of antenna elements are arranged in an array, and the metal member may be disposed along at least one side of the antenna component. This improves radiation characteristics of the plurality of antenna elements disposed along the metal member.

The metal member may be disposed along each of the sides of the antenna component. This improves radiation characteristics of all the outermost antenna elements. In this case, the metal member may be constituted of a plurality of parts that are disposed respectively along each of the sides of the antenna component, or may be constituted of a single part that surrounds the antenna component. The former increases the degree of design freedom, and the latter reduces the number of components.

The width of the metal member may be ½ or more of the wavelength of an electromagnetic wave radiated from the antenna elements. This sufficiently improves radiation characteristics of the antenna element adjacent to the metal member.

The difference in height position between a first surface of the metal member on the side opposite to a mounting surface thereof and a second surface of the ground conductor on the side opposite to a mounting surface of the antenna component may be 1/20 or less of the wavelength of an electromagnetic wave radiated from the antenna elements. This sufficiently improves radiation characteristics of the antenna element adjacent to the metal member. In this case, the height position of the first surface of the metal member may be equal to or lower than the height position of the second surface of the ground conductor. This prevents a radiation pattern of the E plane from tilting.

The antenna component may be constituted of a plurality of antenna units each including a plurality of antenna elements. This makes it possible to prevent a connection failure and the like attributable to a difference in thermal expansion coefficient and to reduce the number of components. In this case, a gap between the metal member and the antenna component may be equal to or wider than a gap between the plurality of antenna units and equal to or narrower than ½ of the wavelength of an electromagnetic wave radiated from the antenna elements. This sufficiently improves radiation characteristics of the antenna element adjacent to the metal member.

The metal member may have a hollow inside thereof. An electronic component such as a semiconductor chip can be accommodated in the hollow.

The antenna component may be a dielectric antenna. This allows a reduction in the entire size.

EXAMPLES

Example 1

A circuit board 2 having a planar size of 120 mm×120 mm was prepared, and four antenna units 10 were arranged in an array around the center portion of the circuit board 2. The configuration of each of the antenna units 10 is as illustrated in FIG. 2 and the like. That is, four antenna elements 14 were arranged in an array, and each antenna element 14 was surrounded by the plurality of ground pillars 15. The planar size of the antenna unit 10 was 10.6 mm×10.6 mm, and the thickness thereof was 2.2 mm. The gap S1 between antenna units 10 was 0.7 mm. The polarization direction of each antenna element 14 is the y-direction, and the yz and xz planes were an E plane and an H plane, respectively.

Figure 11A:
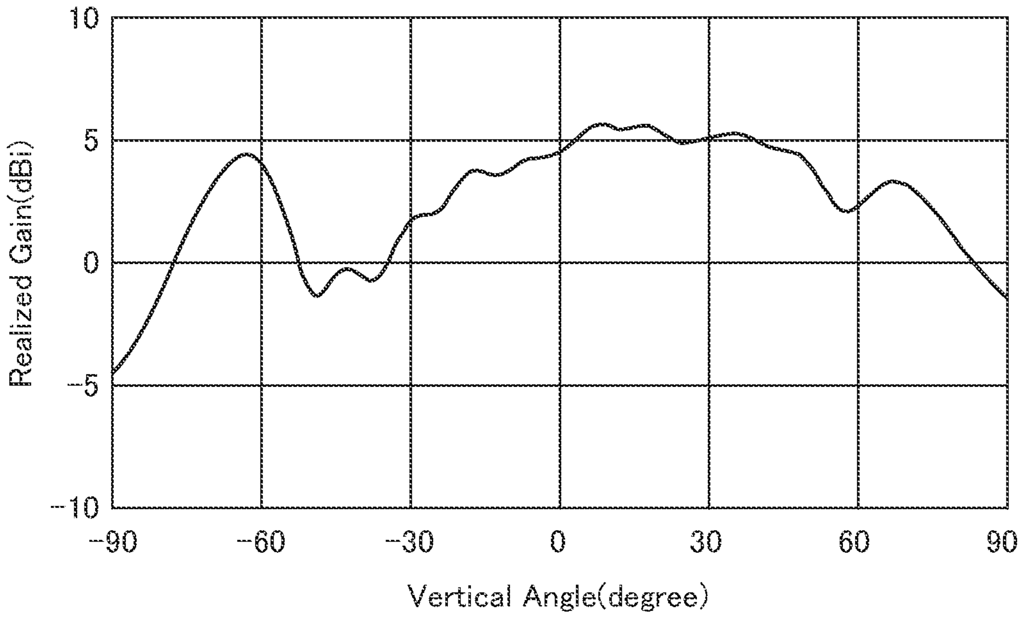
FIG. 11A illustrates a radiation pattern in the absence of the metal member 20.
Figure 11B:
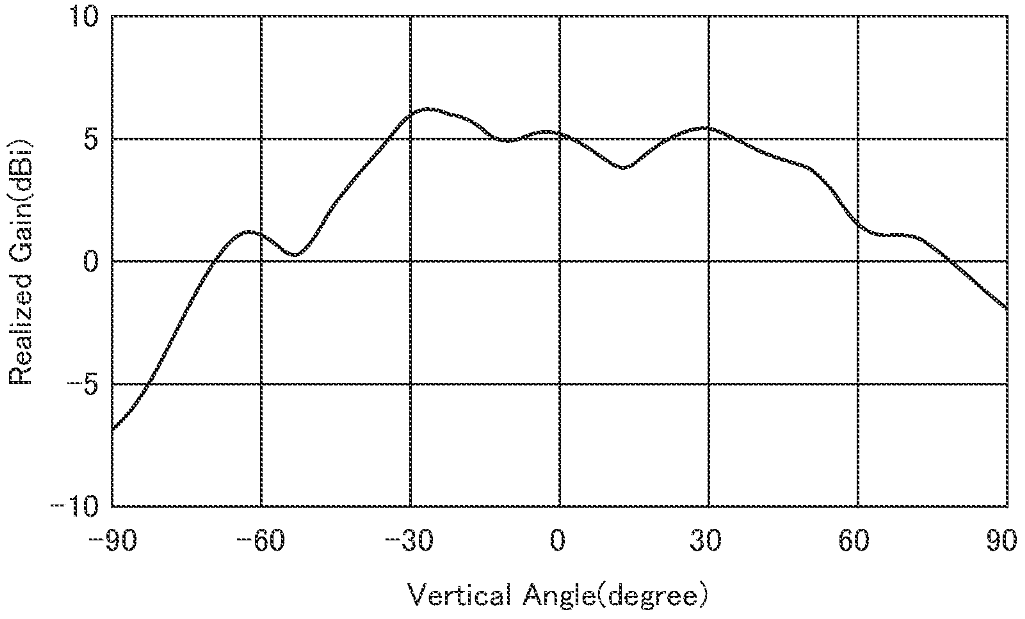
FIG. 11B illustrates a radiation pattern in the presence of the metal member 20.

Then, only the antenna element 14 at the position denoted by A in FIG. 1A was excited at 28 GHz, and a radiation pattern in the yz plane (E plane) was measured. Measurement results are illustrated in FIG. 11. FIG. 11A illustrates a radiation pattern in the absence of the metal member 20, while FIG. 11B illustrates a radiation pattern in the presence of the metal member 20. The thickness of the metal member 20 was 2.2 mm, the same as that of the antenna unit 10, and the width W thereof was 5 mm (≈λ/2). The gap S2 between the metal member 20 and the antenna component 3 was 0.7 mm.

As illustrated in FIG. 11A, in the absence of the metal member 20, the antenna element 14 positioned at the corner portion had a large gain drop around −50°. On the other hand, when the antenna component 3 was surrounded by the metal member 20, a gain drop around −50° was eliminated.

Example 2

Figure 12:
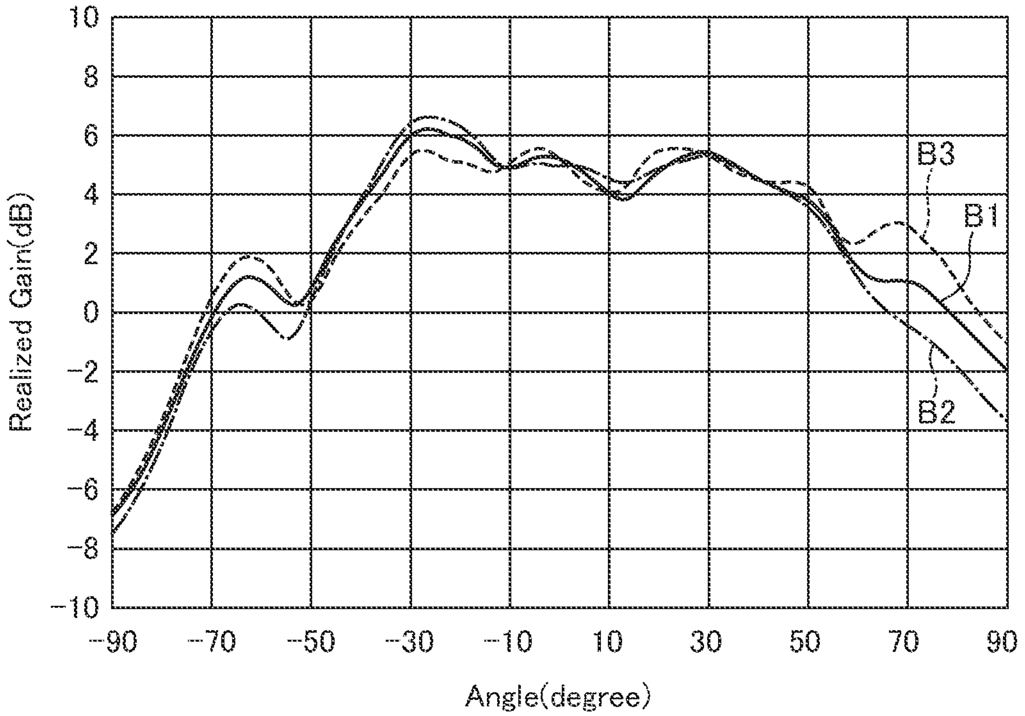
FIG. 12 is a graph indicating results of the Example 2.

Using the configuration of Example 1, a change in radiation pattern when the thickness of the metal member 20, that is, the height position H2 of the upper surface was changed was measured. Measurement results are illustrated in FIG. 12. In FIG. 12, the curve B1 indicates a radiation pattern when the height position H2 coincides with the height position H1 (i.e., the same condition as in Example 1), the curve B2 indicates a radiation pattern when the height position H2 is higher than the height position H1 by 500 μm (≈λ/20), and the curve B3 indicates a radiation pattern when the height position H2 is lower than the height position H1 by 500 μm (≈λ/20).

As illustrated in FIG. 12, when the difference between the height positions H1 and H2 is about 500 μm (≈λ/20), almost the same characteristics as when the height positions H1 and H2 coincide with each other can be obtained.

Example 3

Figure 13:
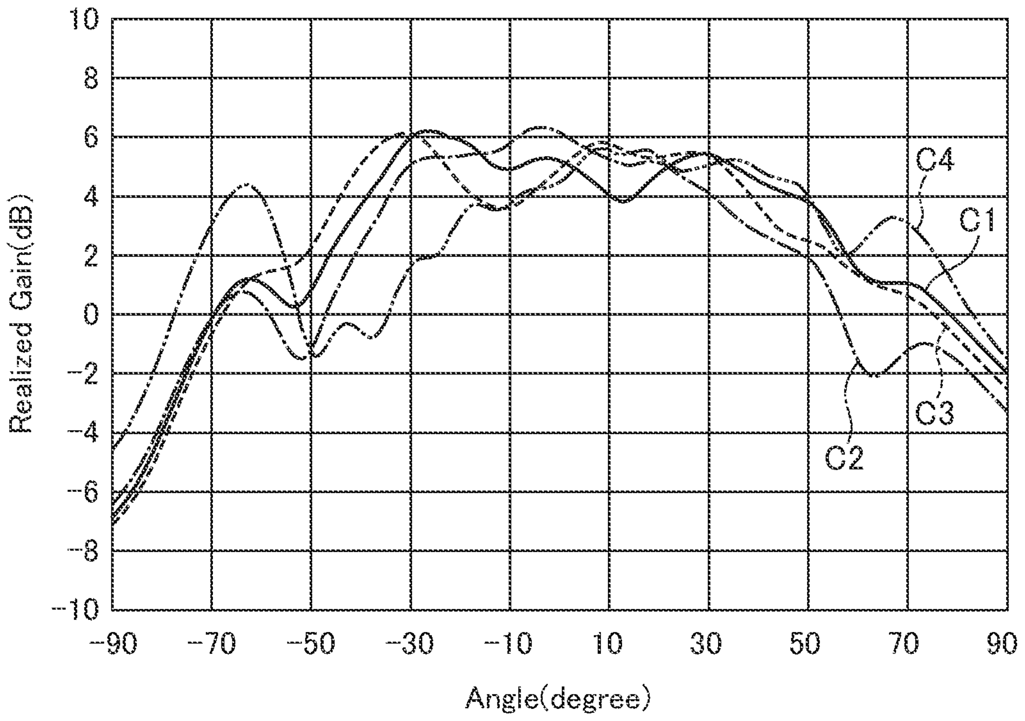
FIG. 13 is a graph indicating results of the Example 3.

Using the configuration of Example 1, a change in a radiation pattern when the width W of the metal member 20 was changed was measured. Measurement results are illustrated in FIG. 13. In FIG. 13, the curve C1 indicates a radiation pattern when the width W is 5 mm (≈λ/2) (i.e., the same condition as in Example 1), the curve C2 indicates a radiation pattern when the width W is 2.5 mm (≈λ/4), the curve C3 indicates a radiation pattern when the width W is 10 mm (≈λ), and the curve C4 indicates a radiation pattern in the absence of the metal member 20.

As illustrated in FIG. 13, as the width W of the metal member 20 is greater, more favorable characteristics can be obtained. Further, there is no significant difference between the characteristics when the width W of the metal member 20 is λ and the characteristics when the width of the metal member 20 is λ/2, so that it is confirmed that a satisfactory effect can be obtained when the width W is equal to or more than λ/2.

What is claimed is:

1. An antenna module comprising:

an antenna component including a plurality of antenna elements and a ground conductor surrounding each of the plurality of antenna elements, the ground conductor including an outside part surrounding outermost ones of the plurality of antenna elements and an inside part sandwiched between the plurality of antenna elements; and a metal member disposed adjacent to the outside part of the ground conductor, wherein the inside part of the ground conductor is greater in width than the outside part of the ground conductor, wherein the metal member has a first surface facing a same direction as the antenna elements, and wherein the metal member defines a hollow covered with the first surface.

2. The antenna module as claimed in claim 1, wherein the antenna component has a configuration in which the plurality of antenna elements are arranged in an array, and wherein the metal member is disposed along at least one side of the antenna component.

3. The antenna module as claimed in claim 2, wherein the metal member is disposed along each of sides of the antenna component.

4. The antenna module as claimed in claim 3, wherein the metal member includes a plurality of parts that are disposed respectively along each of the sides of the antenna component.

5. The antenna module as claimed in claim 3, wherein the metal member is constituted of a single part that surrounds the antenna component.

6. The antenna module as claimed in claim 1, wherein a width of the metal member is ½ or more of a wavelength of an electromagnetic wave radiated from the antenna elements.

7. The antenna module as claimed in claim 1, wherein a difference in height position between the first surface of the metal member and a second surface of the ground conductor on a side opposite to a mounting surface of the antenna component is 1/20 or less of a wavelength of an electromagnetic wave radiated from the antenna elements.

8. The antenna module as claimed in claim 7, wherein the height position of the first surface of the metal member is lower than the height position of the second surface of the ground conductor.

9. The antenna module as claimed in claim 1, wherein the antenna component includes a plurality of antenna units each including a plurality of antenna elements.

10. The antenna module as claimed in claim 9, wherein a gap between the metal member and the antenna component is equal to or wider than a gap between the plurality of antenna units and equal to or narrower than ½ of a wavelength of an electromagnetic wave radiated from the antenna elements.

11. The antenna module as claimed in claim 1, wherein the antenna component is a dielectric antenna.

12. The antenna module as claimed in claim 1, wherein the outside part of the ground conductor is arranged between the plurality of antenna elements and the metal member.

13. The antenna module as claimed in claim 1, wherein the ground conductor individually surrounds each of the plurality of antenna elements such that two of the plurality of antenna elements are not adjacent to each other without the ground conductor interposed therebetween.

14. An antenna module comprising:

an antenna component including a plurality of antenna elements and a ground conductor surrounding each of the plurality of antenna elements, the ground conductor including an outside part surrounding outermost ones of the plurality of antenna elements and an inside part sandwiched between the plurality of antenna elements; and a metal member disposed adjacent to the outside part of the ground conductor, wherein the inside part of the ground conductor is greater in width than the outside part of the ground conductor, wherein the metal member has a first surface facing a same direction as the antenna elements, wherein the ground conductor has a second surface facing a same direction as the antenna elements, and wherein height position of the first surface of the metal member is lower than height position of the second surface of the ground conductor.

15. The antenna module as claimed in claim 14, wherein the outside part of the ground conductor is arranged between the plurality of antenna elements and the metal member.

16. The antenna module as claimed in claim 14, wherein the ground conductor individually surrounds each of the plurality of antenna elements such that two of the plurality of antenna elements are not adjacent to each other without the ground conductor interposed therebetween.

* * * * *